Dec. 12, 1939.  L. E. DORSEY  2,183,063
PENMANSHIP CORRECTING AND ANALYZING RULER
Filed Jan. 3, 1938
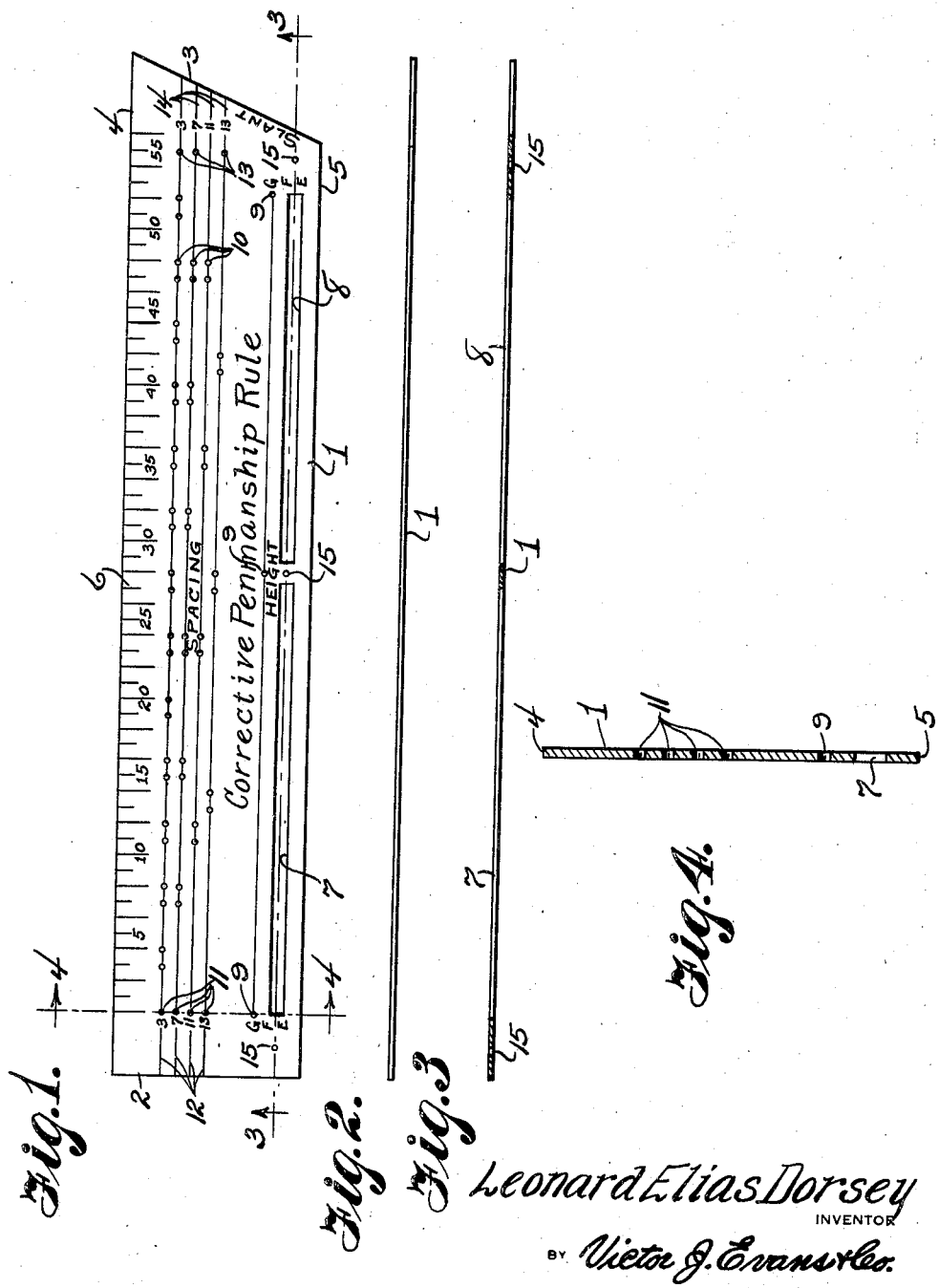

UNITED STATES PATENT OFFICE 2,183,063

PENMANSHIP CORRECTING AND ANALYZING RULER

Leonard Elias Dorsey, Coatesville, Pa.

Application January 3, 1938, Serial No. 183,179

1 Claim. (Cl. 33—107)

This invention relates to rulers, and its general object is to provide a ruler that is primarily designed for use in teaching penmanship, in a manner to bring about uniform spacing of words and letters of the alphabet, as well as proper formation, height and slant of the letters, in that the ruler is used mainly to analyze and correct deformities in hand writing, by facilitating the drawing of lines with respect to and through the letters, and between the words of the writing, to clearly indicate the mistakes if any, in the spacing, height and slant thereof, and also to draw lines to act as spacing, height and slant guides for the purpose of practicing penmanship.

A further object is to provide a ruler of the character set forth, that is simple in design, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a face view of the ruler which forms the subject matter of the present invention.

Figure 2 is a view illustrating the upper edge thereof.

Figure 3 is a sectional view taken approximately on line 3—3 of Figure 1, looking in the direction of the arrows.

Figure 4 is a sectional view taken approximately on line 4—4 of Figure 1, looking in the direction of the arrows.

It is well known, but it might be mentioned for the purpose of this application that certain styles of penmanship require that the letters be arranged at an inclination, and the small letters are not all of the same width and height, with the result considerable difficulty is experienced by pupils learning penmanship in obtaining the proper slant, width and height of the letters and my ruler is primarily designed to overcome those difficulties and enable the pupil to clearly see the mistakes and bring about correction thereof, as well as clear and uniform hand writing in minimum time and with minimum effort.

With the above in view, I have devised a ruler which as shown in the drawing is of the usual strip formation, in that the body 1 is relatively narrow and is made from any material suitable for the purpose. One end of the body, which is indicated by the reference numeral 2 is straight, while its opposite end 3 is disposed at an inclination inwardly from the upper straight edge 4 of the ruler to the lower straight edge 5, therefore the upper edge is longer than the lower edge.

The face of the body along the upper edge has marked or otherwise formed thereon, graduation lines 6 that are equally spaced apart, and the first and last line are spaced a considerable distance inwardly from the ends of the body as clearly shown in Figure 1. The spaces between the lines are numbered in multiples of 5, and 55 spaces are shown in the form of the ruler of the drawing, but any number of spaces may be provided, it depending of course upon the length of the ruler. Every other one of the lines 6 is longer than the lines between the same and the spaces between the long lines are approximately one-fourth of an inch wide, therefore the spaces between the adjacent long and short lines are one-eighth of an inch wide, and the latter spaces act as units for the purpose of drawing division lines of the proper width of letters, it being obvious that some letters such as a, c, d, f, etc., are of a width to require two spaces, other letters such as b, y, u, p, etc., require three spaces, while still others such as M, m, W, w, require four spaces.

In providing the block spaces for the letters, it will be obvious that suitable horizontal base and top lines can be drawn by using the upper edge 4, thence marking the drawn lines into the proper spaces by use of the graduations, and finally drawing slanting lines between the marks, by use of the inclined edge 3, consequently it will be seen that paper can be readily ruled or lined and blocked for the pupil to practice the width and slant of the letters, merely by using the upper edge 4, the graduations 6 and the inclined edge 3.

After sufficient practice, it will be found that the pupil can obtain substantially the proper width and slant of the letters, but the height thereof is not proper, in that some of the letters extend above others, and the purpose of correcting the height, intermediate guide lines are necessary for disposal between the base and top lines. For the purpose of drawing the height lines, I provide the body with two slots 7 and 8 which extend longitudinally of the body in alignment with each other, as best shown in Figure 1, which likewise discloses that the slots have their inner ends in close proximity, while their outer ends terminate adjacent to the outer ends of the body, and that the slots are arranged parallel with and adjacent to the lower edge 5.

In providing the height lines, the lower edge 5 is positioned to coincide with the base line on the paper and lines are drawn along the lower edges of the slots, with the result it will be seen that the pupil can then confine the height of complete letters such as a, c, u, etc., between the base lines and height lines, while the body portions of other letters such as d, f, g can likewise be so confined. For distinction the lower edges of the slots are designated by the letter "E" on the body, while the upper edges are designated by the letter "F", and the word "Height" is arranged between the slots, as shown. The upper edges of the slots can also be used for height lines to act as guides for the upper ends of certain letters, such as d, p, t, etc. The top lines act as guides for the upper ends of letters, such as h, b, l, etc.

When paper that is already ruled is used, the rule lines thereon act as base and top lines, and in that instance it is only necessary to draw the intermediate lines between the same, by using the upper and lower edges of the slots. While it has been stated that the base and top lines may be drawn by the upper edge of the ruler or body, I provide means on the ruler whereby the base and top lines can be drawn by the lower edge 5. In that instance, a line can be drawn on the paper along the lower edge 5, thence dots can be made on the paper through the openings 9 which are arranged in the body above the slots 7 and 8 and at the outer ends thereof, and above the space between the same, as best shown in Figure 1. A line is then drawn between the dots, to provide the top line, and which will be properly spaced with respect to the base line. The openings 9 are designated by the letter "G".

Difficulty is likewise experienced by the pupil in properly spacing words, and for that purpose, slant lines are provided between the base and top lines, by the use of openings 10, which are arranged in pairs through the body of the ruler, and in parallel rows or line groups extending longitudinally of the body, the groups being designated respectively by the numerals "3", "7", "11" and "13". The pairs of openings of the line group "3" are spaced three unit spaces apart, the pairs of openings of the line group "7" are spaced seven unit spaces apart, the pairs of openings of the line group "11" are spaced eleven unit spaces apart and the pairs of openings of the line group "13" are spaced thirteen unit spaces apart. It has been found in practice that two letter words can be written in three unit spaces, four letter words in seven unit spaces, words that include approximately seven letters can be written in eleven unit spaces, while words having approximately nine letters can be written in thirteen unit spaces. Disposed in alignment with the line groups of openings 10 are openings 11, and the openings 11 are likewise disposed below and in alignment with the first line of the graduation lines 6, and lines 12 are arranged between the straight edge 2 and the openings 11, therefore the openings 11 are arranged adjacent the end 2 of the ruler and I also provide like openings 13 adjacent the opposite or inclined end 3, with lines 14 extending from the openings 13 to the inclined end. The lines 12 and 14 may extend for the entire length of the ruler and in that event they intersect the openings 10, 11 and 13, as shown.

In providing the slant lines for spaces between the words, the lines 12 and 14 are disposed to coincide with the base lines of the paper, thence a pencil is disposed in the respective openings, to provide dots on the paper. The inclined end 3 can then be used for drawing lines between the base and top lines, as will be apparent.

The word "Spacing" is preferably provided on the body within the area of the openings 10, as shown, to designate that the openings are primarily designed to provide the space lines just referred to.

After considerable practice on the part of the pupil, the intermediate lines or those between the base and top lines, as well as the slant lines can be eliminated from the paper and the pupil required to write on the base line. A sample of the writing can then be analyzed by drawing the intermediate lines between the top and base lines, to ascertain whether or not the letters are of the proper height, and slant lines can be drawn through the letters to ascertain if they are arranged at the proper inclination. Slant lines can also be drawn through the sentences of the writing to ascertain if the words are properly spaced. All of the lines used for analyzing writing are made in the same manner as the practice lines.

I also provide openings 15, there being one opening 15 adjacent the ends of the body and one in the space between the slots. These openings are designated by the letter "B" and are primarily designed for the purpose of cooperating with the openings 9 and the lower edge 5 to provide lines for making capital letters. In other words dots can be made on the paper through the openings 9 and 15 and the lower edge, and lines drawn between the dots, it being obvious that there will be three lines, or in other words a base line, a top line and an intermediate line, and the intermediate line acts as a guide for the central portions of certain capital letters, such as B, P, R, etc.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A ruler for use in drawing lines for teaching and analyzing penmanship, comprising a flat elongated strip like body having straight upper and lower edges and a pair of slots spaced apart in longitudinal alignment, said slots being disposed parallel with and adjacent to the straight lower edge for use with the latter in drawing horizontal guide lines, said body having openings disposed adjacent to each of the ends of the slots for receiving the point of a writing implement to make dots to act as guides for drawing horizontal lines for cooperation with the first lines, graduations along the straight upper edge of the body for use in making marks by said writing implement to act as guides for drawing slanting lines with respect to the horizontal lines, said body having an inclined edge at one end thereof to cooperate with the marks for use in drawing the slanting lines, said body having openings therein between the straight upper edge thereof and the slots to receive the point of the writing implement to make dots to also cooperate with the inclined edge for use in drawing slanting lines with respect to the horizontal lines, the latter openings being arranged in parallel rows extending longitudinally of the body, the openings between the end openings of the rows being arranged in pairs, the pairs of openings of each row being disposed an equal distance apart, and the distance between the pairs of openings being different in each row.

LEONARD ELIAS DORSEY.